Figure 1:
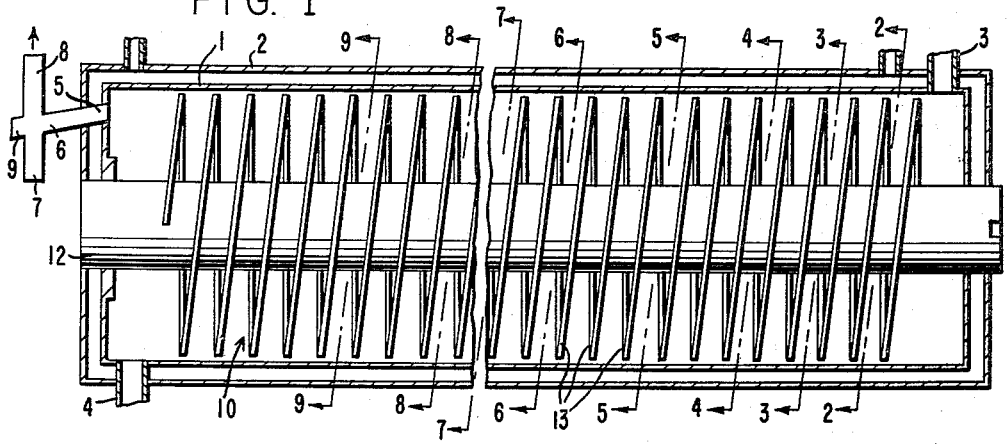
Figure 2:
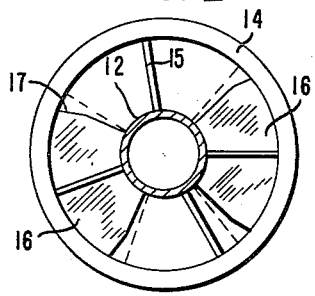
Figure 3:
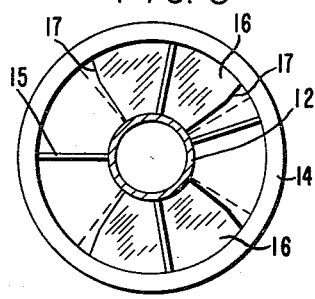
Figure 4:
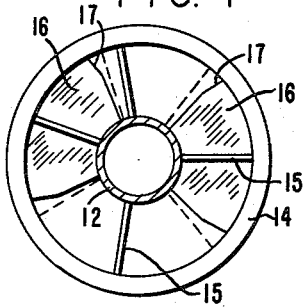
Figure 5:
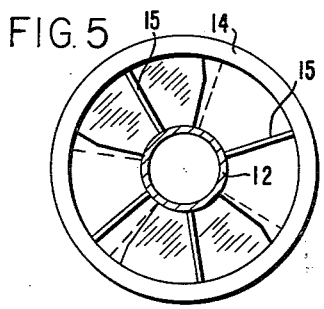
Figure 6:
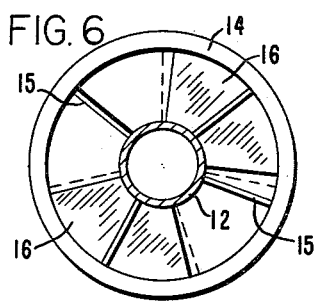
Figure 7:
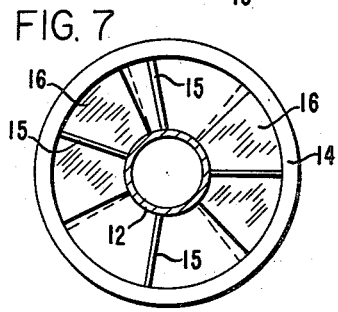
Figure 8:
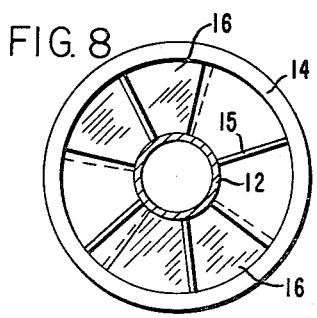
Figure 9:
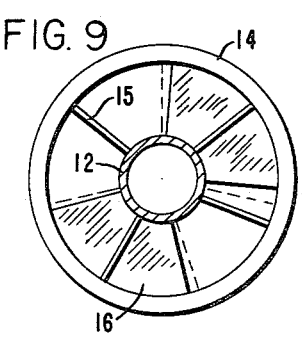

INVENTORS
WILLIAM G. ATKINSON
JEREMIAH L. THOMAS, JR.

ATTORNEY

United States Patent Office 3,118,739
Patented Jan. 21, 1964

3,118,739
POLYMER FINISHER APPARATUS
William Graham Atkinson, Chester, and Jeremiah L. Thomas, Jr., Richmond, Va., assignors to E. I. du Pont de Nemours and Company, Wilmington, Del., a corporation of Delaware
Filed Jan. 20, 1959, Ser. No. 787,967
2 Claims. (Cl. 23—285)

This invention relates to polymeric material and more particularly to linear condensation polymers and improvements in their preparation.

In the preparation of linear condensation polymers, such as polyamides and polyesters, a low molecular weight volatile by-product, such as water or ethylene glycol, is liberated during the condensation reaction. In order that the polymerization continue until a desirably high molecular weight is reached, it is necessary that this volatile reaction product be removed. In the continuous polymerization of the polyamides, for instance, the initial polymerization may be carried out at superatmospheric pressures and part of the water flashed off when the pressure is reduced to the atmospheric level. However, the molecular weight of the polymer at this stage is still low and it is necessary to continue heating and remove additional water as it is liberated to produce a polymer of the desired molecular weight for fiber forming, molding, etc. This is usually accomplished by passing the polymer through a container where it is heated while being agitated with a screw type agitator to facilitate removal of the water, the inflow and outflow of the molten polymer being adjusted to keep the container in a partially filled state. Vessels of this type are usually referred to as polymer finishers. A process of this type is described in U.S. 2,689,839.

In some polymer finishers, it has been found necessary to provide a space above the agitator, by placing a dome on a cylindrical vessel, by making the vessel non-cylindrical, or by making the agitator smaller than the vessel, to provide adequate space for the volatile reaction by-product to pass from the vessel without carrying excessive amounts of entrained polymer. During the use of these finishers, however, polymer collects on the walls in the area above the agitator and eventually forms a gel which, on accumulation, drops into the main polymer mass and drastically reduces the quality of the polymer produced. While a cylindrical finisher might be operated with a series of vents in the top, these vents would obviously offer the same difficulty as the dome or other device since accumulation of the polymer in the vents would result in gel formation and eventual contamination of the polymer in the finisher. As a result of this situation, it has been necessary to shut down and dismantle the finisher at fairly frequent intervals to clean the walls. This cleaning operation is quite expensive since the hardened polymer must usually be burned off of the surfaces of the finisher and pipes leading to it to insure thorough removal. Even with frequent interruptions of the process for cleaning, the quality of the polymer produced is not as high as is desirable.

It is, accordingly, an object of this invention to provide an improved process and apparatus for the production of high molecular weight linear condensation polymers. Another object is to provide an improved process and apparatus for increasing the molecular weight of linear condensation polymers, wherein gel formation on the interior walls of the vessel is inhibited.

The above objects are accomplished in accordance with this invention by the novel process comprising passing a molten polymer into a substantially horizontal polymerization zone, heating the polymer during its passage through the zone to promote continued polymerization, agitating the polymer to liberate a volatile reaction product and continuously expose new polymer surface to the atmosphere, continuously directing the voltatile reaction product away from the polymerization zone to prevent the re-entry into the zone of polymer entrained in the evolving gas. More particularly, the process of this invention comprises passing the molten polymer into a cylindrical container having its longitudinal axis in a substantially horizontal position, heating the polymer during its passage through the vessel to maintain it in a molten state and thereby promote continued polymerization and liberation of a volatile gaseous by-product, and agitating the polymer continuously whereby the container walls and agitator are coated with the polymer. The agitation also continuously exposes new polymer surface to the atmosphere above the polymer body and facilitates the removal of the volatile by-product. The accumulated polymer on the cylinder walls is continuously removed to prevent its re-entry in the form of gel into the main body of the polymer. The evolving volatile material is also continuously removed from the vessel and directed downwardly and away from the container to prevent the re-entry, in the form of gel, of the polymer entrained in the evolving gas into the main body of polymer.

The apparatus provided in accordance with this invention comprises a cylindrical container with its longitudinal axis disposed in a substantially horizontal position. The vessel is provided with a heating jacket or other suitable means for heating the polymer, an inlet for polymer situated near one end of the vessel, an outlet near the other end, a vent for volatile reaction product and an agitator whose axis of rotation substantially coincides with the longitudinal axis of the container. The preferred agitator consists of a rotatable helical ribbon, the central portion of which is open except for the necessary supports for the helix. The agitator is of a diameter only slightly less than the inside container diameter and hence passes near the walls of the vessel. Preferably, the ribbon agitator is equipped with baffles, generally in the plane of the flight, which partially close the central openings through the agitator, at intervals along the length of the agitator. The vent for the volatile reaction product is provided in one end of the container at a point above the level of the liquid being treated. A conduit leading from the vent is inclined downwardly to carry the entrained polymer away and thereby prevent re-entry of entrained polymer into the vessel.

FIGURE I illustrates a typical reaction vessel of this invention, the side being cut away to show the ribbon-type agitator.

FIGURES II, III, IV, V, VI, VII, VIII, and IX illustrate sectional views along lines 2—2, 3—3, 4—4, 5—5, 6—6, 7—7, 8—8, and 9—9, respectively, of FIGURE I.

A specific embodiment of the apparatus of this invention is illustrated in FIGURE I. In particular, there is shown a cylindrical container 1 surrounded by a heating jacket 2, an inlet 3 for admission of a low molecular weight polymeric composition to the container 1, an outlet 4 for passage of the finished high molecular weight polymer, a vent 5 for a volatile by-product, a conduit 6 leading from the vent and inclined downwardly to a polymer trap 7 and a conduit 8 for the volatile by-product. The end 9 of the conduit is closed off. The container 1 contains a rotatable helical ribbon agitator 10 whose axis of rotation coincides with the axis of the cylindrical container and which is mounted for rotation through central axle 12 and a suitable motor (not shown). The agitator consists of a helical ribbon of 26 flights 13 (only 22 being shown) consisting of blades 14 mounted on supports 15 attached to central axle 12.

The open center portion of the agitator is shown in any one of the other drawings. This portion is interrupted only by supports 15 for blades 14 and in some flights by baffles 16. These baffles are in the form of truncated wedges placed in pairs, one each on opposite sides of the flights. In the embodiment illustrated, pairs of baffles 16 are placed in each of flight numbers 2, 4, 6, 9, 12, 15, 18, and 21, no two adjacent sets of baffles being exactly in line. This arrangement of baffles is shown more clearly in FIGURES II, III, IV, V, VI, VII, VIII, and IX, which illustrate cross sections of the flights containing baffles.

Operation of this apparatus is readily understood. Polymer of comparatively low viscosity is forced by suitable means into the inlet of the vessel and passes to the other end and out the outlet, the flow being effected largely through gravity, the forwarding action of the agitator being small. The axis of the vessel usually is substantially horizontal, although it may be inclined somewhat to influence the flow if desired. The necessary power for the agitator is supplied by conventional means from any suitable source.

The apparatus is operated in a partially filled condition, i.e., about ⅓ full to about ¾ full. As the agitator turns, the mass of polymer in the bottom of the vessel is stirred to continually expose new surface to the atmosphere. In addition, the agitator blades carry the polymer around the walls of the vessel so that the walls are continually coated with polymer. The agitator blades pass close to the walls and prevent the accumulation of stagnant polymer so that gel formation is greatly inhibited. The construction of the agitator makes it possible for the volatile reaction product to pass centrally through the vessel to the vent. As the polymer progresses through the vessel, the condensation reaction continues with the liberation of water or other low molecular weight material which is removed rapidly due to the large surface area exposed by the action of the agitator. This results in a rapid and substantially constant increase in viscosity to a desirably high level suitable for fiber formation or other purposes. In the preferred embodiment of the apparatus, the baffles in the agitator prevent the passage of any low molecular weight polymer past the slower moving high molecular weight material and thus increases the uniformity of the resulting polymer.

As mentioned above, the vent is inclined downwardly so that polymer entrained in the escaping volatile byproduct flows away from the vessel, thus preventing its re-entry, in the form of gel polymer, into the vessel. Polymer accumulating in the vent base may be allowed to flow into a suitable trap or be drawn off continuously. Since the amount of polymer is usually small, an electrical heating element may be placed in the trap to burn the polymer.

*Example I*

A 65% solution of hexamethylene diamine-adipic acid salt in water at 208° C. is pumped continuously into a reaction vessel in which the salt is concentrated to a temperature of 235° C. at 250 p.s.i.g. (pounds per square inch gage) over an average residence time of 3 hours. The pressure is then reduced to atmospheric and a considerable portion of the water permitted to vaporize. The resulting mixture of low molecular weight polymer and water having a relative viscosity of 20 and a water content of about 14% is pumped continuously at a rate of about 2500 lbs./hr. into a cylindrical finisher 4 feet in diameter and 14 feet in length. The rates of inflow and outflow of the polymer are adjusted to maintain a level of about 36 inches of polymer in the finisher and an average holding time of 80 minutes. The agitator consists of a helical ribbon 3 inches thick and ½ inch wide of 26 flights mounted on spokes attached to a central axle having a diameter of 16 inches. The agitator rotates at a speed of 1.0 r.p.m. (revolution per minute), the agitator blades passing within ⅜ inch of th ewall of the reaction vessel. The temperature of the polymer is maintained at 280±2° C. by means of a jacket around the vessel through which Dowtherm vapor is passed. Water vapor passes out of a vent located at the end of the finisher. Entrained polymer flows down an inclined conduit leading from the vent and is collected in a trap and burned by means of an electrical heating element inserted in the trap. The polymer issuing from the outlet of the finisher has a relative viscosity of about 42 and is characterized by a high quality as evidenced by the absence of gel particles. The polymer is extruded in a conventional manner to form a yarn of high strength and good uniformity. The finisher is continued in operation in this fashion for a period of two months after which it is taken out of service and examined. On examination, the interior walls and agitator blades are found to be remarkably free of accumulated gel polymer and are particularly clean as compared to a conventional finisher, having a screw-type agitator and equipped with a steam dome to permit escape of gases, which had been operating under similar conditions for a like period of time.

*Example II*

Example I is repeated except that the agitator is modified by placing baffles in flights 2, 4, 6, 9, 12, 15, 18, and 21. These baffles are placed in the flights of the agitator in pairs, one opposite the other in the same flight, the placement of the baffles in the various flights being staggered so that no two adjacent sets of baffles are exactly in line. While the inherent viscosity of the low molecular weight polymer entering the finisher is the same as in Example I, the relative viscosity of the polymer issuing from the finisher is found to be increased to about 50. The polymer is of high quality as evidenced by absence of gel particles and fiber extruded from the polymer is of high strength and good uniformity. The finisher is continued in operation in this fashion for a period of five months, after which it is found to still be in good operating condition with no deterioration in polymer or yarn quality, while a conventional finisher operating under similar conditions had to be shut down for cleaning after about 120 days.

The present invention provides a novel process and apparatus for increasing the molecular weight of a linear condensation polymer and the removal of volatile reaction product during polymerization to produce a high quality polymer suitable for extrusion into high tenacity fibers and for other end uses. The process and apparatus of this invention may be used to produce polymer of exceptionally high quality as evidenced by freedom from gel particles and are particularly suited for continuous production of high molecular polymer. The apparatus may be operated for long periods of time without the need for costly interruptions due to the build-up of gel polymer on the surfaces.

Among the advantages derived from the practice of the process of this invention are (1) the removal of volatile reaction products from the vessel under conditions such that entrained polymer cannot re-enter the vessel; (2) removal of volatile reaction products from all parts of the vessel freely; and (3) prevention of the build-up of thick layers of stagnant polymer on the walls of the vessel by continuously wiping all of the walls with the blades of the agitator.

The re-entry of entrained polymer carried into the vent line with the escaping low molecular weight reaction product is prevented by placing the vent in the end of the vessel and inclining the conduit section attached to the vessel slopes downwardly away from the vessel to drain accumulated polymer away. The vent must, of course, be placed well above the polymer level and is preferably placed close to the top of the vessel. Obviously vents may be employed in both ends of the vessel and more than one vent may be used if desired. However, for most purposes one vent will be satisfactory.

Removal of volatile low molecular weight reaction products from all parts of the vessel is accomplished by the use of a ribbon-type agitator which permits free passage of the gaseous reaction product throughout the vessel so that flow of the material to the vent is not obstructed. Additional advantages of the particular ribbon type agitator of this invention, among many others, are: (1) the amount of surface for gel deposition on the agitator is diminished; (2) a higher level of polymer in the finisher may be employed, thus increasing the capacity of the vessel; and (3) control of the liquid level in the finisher is much less critical. In most solid flight screw-type agitators, the finisher cannot be operated more than half full, otherwise the polymer will be pumped through the screw independently of the action of the agitator and as a result the proper holding time will not be achieved. Obviously, this type of agitator requires impracticably close control of the liquid level to prevent this condition.

The accumulation of thick layers of stagnant polymer on the walls of the vessel with the resultant formation of polymer gel is prevented by passage of the agitator blades close to all the walls of the vessel. While the exact clearance between the agitator blade and the vessel walls will be selected on a basis of the processing conditions, for most purposes a clearance between the agitator blade and the vessel walls will be in the range of about $\frac{1}{16}$ inch to about $\frac{1}{2}$ inch, which is sufficient to keep the vessel wall clear of polymer. The use of an agitator with baffles in the flights is particularly desirable where relatively high molecular weights are desired and where large volumes of polymer must be handled. It is believed that the action of the baffles is increasing the molecular weight is due to the baffles preventing low molecular weight material bypassing the slower moving high molecular weight materials through the development of channels in the polymer mass.

While the exact number and size of the baffles to be inserted in the agitator flights will depend on the processing conditions employed, an appreciable improvement can be expected if baffles which occupy from about 25% to about 60% of the free area within the individual flight are placed in at least about 20% of the flights. The number of flights of the agitator which are equipped with baffles will, of course, vary with the spacing of the flights. In general, the baffles are not spaced closer together than about 12 inches, since close spacing may unduly impede the flow of polymer through the vessel. The maximum area within the flight which may be occupied by the baffles is dependent on the liquid level in the vessel, since a sufficient passageway must be maintained above the liquid for movement of the volatile reaction product to the vent. Therefore, the size and shape of the baffles within a given flight of the agitator must be adjusted to provide at all times a free space above the liquid level having a height at least equal to the cross-sectional area of the vent. Preferably, the baffles are in the form of truncated wedges and are placed in pairs, one each on opposite sides of the flight.

While the agitator is preferably of the helical ribbon type with baffles as described above, any agitator fulfilling the requirements (1) of having suitable openings in the blades for passage of gases through the vessel, (2) of having blades which pass close to the walls of the vessel, and (3) of providing adequate mixing of the polymer mass, may be employed. Various suitable designs which meet the above requirements will be obvious to those skilled in the art.

In addition to the ribbon-type agitators having a central shaft, any of the so-called shaftless-type ribbon agitators are likewise suitable and may be used if desired.

It is generally preferably that the polymer be moved through the finisher rather slowly to provide time for an adequate increase in molecular weight. To this end, it is desirable that the pumping action of the agitator be small. The desired rate of flow of the polymer can be readily controlled by adjusting the pitch of the agitator flights and by suitable selection of agitator speed. Preferably, the agitator speed will be in the range of 0.5 to 10 r.p.m. and for optimum results with polyamides a speed in the range of 0.5 to 1.5 is desirable.

In order to prevent oxidative degradation of the hot polymer, it is usually desirable to exclude oxygen from the vessel. This may be accomplished by flushing the vessel with an inert gas, such as nitrogen, prior to starting the process and keeping the vessel under a slight positive pressure with nitrogen, steam, or volatile reaction product, e.g., about 0.1 to about 4 inches of water pressure, during the operation. In the preparation of polymer of very high molecular weights, it may be desirable to pass dry inert gas, such as dry nitrogen through the vessel continuously to sweep out the low molecular weight reaction product and thus accelerate the polymerization.

The temperature at which the polymer in the vessel is maintained will obviously vary depending upon the melting point of the material. The temperature must be high enough to keep the polymer in a molten state but in most cases it should be maintained at a level only slightly above the melting point of the polymer for reasons of economy and to prevent degradation of the polymer.

The size and shape of the finisher will, of course, depend to some extent on the output of polymer required and other conditions. The vessel is preferably cylindrical in order that the walls of the vessel be wiped by the agitator blades and, in general, the vessel will be in the shape of an elongated cylinder. For most purposes, a vessel having an interior length about 3 times the interior diameter will prove satisfactory.

The process and apparatus of this invention is applied most advantageously to the processing of linear condensation polymers such as the various polyamides and polyesters which are well known in the art, where a volatile by-product is evolved during polymerization.

We claim:

1. An improved self-cleaning polymerization apparatus for containing polymeric materials undergoing a polymerization reaction, heating and agitating such materials to enable separation of volatile gaseous by-products of the reaction from the main product, while moving the reacting materials uniformly through the apparatus, said apparatus comprising an elongated hollow cylindrical structure having a substantially horizontal axis and provided with closed end portions and means for supplying heat to said structure, a material supply inlet passageway formed in one end of said cylindrical structure, a first material outlet passageway formed in the other end of said structure a second volatile gaseous product outlet passageway formed in one of said ends of the cylinder structure and spaced above the level of said first outlet passageway, a wall-cleaning material-agitating means movably mounted in said cylindrical structure, said means comprising a driven shaft member coaxially rotatably mounted in the cylinder structure, at least one thin narrow blade element secured to said shaft, said blade formed into a helix of a diameter closely fitted to the inside diameter of said cylinder structure and having its axis coaxial with that of the shaft and the inside of said cylinder structure, a plurality of longitudinally spaced angularly staggered transverse substantially planar baffle elements carried by said shaft member and extending transversely thereto from said shaft member to said blade element, said baffle elements each lying in a plane substantially perpendicular to the shaft member axis and each blocking off from about 25% to about 60% of the transverse cross-sectional area of the interior of the cylinder structure, said blade element constructed and arranged to cooperate with said interior surface of the cylinder structure and a mass of material supplied through said inlet passageway into the cylinder structure to accomplish a uniform mixing action and a wiping action along said interior surface to prevent accumulation of undesirable material while permitting free escape of any volatile gaseous by-products directly to said second outlet passageway and exerting a forwarding action on such material from said inlet to said outlet passageway.

2. An improved self-cleaning polymerization apparatus for containing polymeric materials undergoing a polymerization reaction, heating and agitating such materials to enable separation of volatile gaseous by-products of the reaction from the main product, while moving the reacting materials uniformly through the apparatus, said apparatus comprising an elongated hollow cylindrical structure having a substantially horizontal axis and provided with closed end portions and means for supplying heat to said structure, a material supply inlet passageway formed in one end of said cylindrical structure, a first material outlet passageway formed in the other end of said structure a second volatile gaseous product outlet passageway formed in one of said ends of the cylinder structure and spaced above the level of said first outlet passageway, a wall-cleaning material-agitating means movably mounted in said cylindrical structure, said means comprising a driven shaft member coaxially rotatably mounted in the cylinder structure, at least one thin narrow blade element secured to said shaft, said blade formed into a helix of a diameter closely fitted to the inside diameter of said cylinder structure and having its axis coaxial with that of the shaft and the inside of said cylinder structure, a plurality of longitudinally spaced angularly staggered transverse baffle elements carried by said shaft member and extending transversely thereto between said shaft member and said blade element, said baffle elements each blocking off from about 25% to about 60% of the transverse cross-sectional area of the interior of the cylinder structure, said blade element constructed and arranged to cooperate with said interior surface of the cylinder structure and a mass of material supplied through said inlet passageway into the cylinder structure to accomplish a uniform mixing action and a wiping action along said interior surface to prevent accumulation of undesirable material while permitting free escape of any volatile gaseous by-products directly to said second outlet passageway and exerting a forwarding action on such material from said inlet to said outlet passageway, said volatile gaseous product outlet passageway provided with means for preventing re-entry into the cylinder structure of entrained material carried by exiting volatile gaseous by-products which may accumulate in said gaseous product outlet passageway.

References Cited in the file of this patent
UNITED STATES PATENTS

| | | |
|---|---|---|
| 2,064,131 | Tuscan et al. | Dec. 15, 1936 |
| 2,182,556 | Griswold | Dec. 5, 1939 |
| 2,600,871 | Helwig | June 17, 1952 |
| 2,758,915 | Vodonik | Aug. 14, 1956 |
| 2,847,196 | Franklin et al. | Aug. 12, 1958 |
| 2,856,387 | Jacobson et al. | Oct. 14, 1958 |
| 2,869,838 | Ryder | Jan. 20, 1959 |
| 2,880,197 | Coleman | Mar. 31, 1959 |
| 2,894,824 | Lanning | July 14, 1959 |